Oct. 11, 1960     A. E. MARTIN     2,955,508
DOUBLE BEAM SPECTROMETERS
Filed April 4, 1956
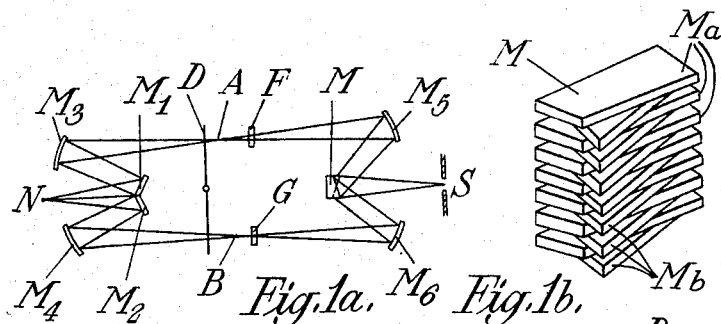
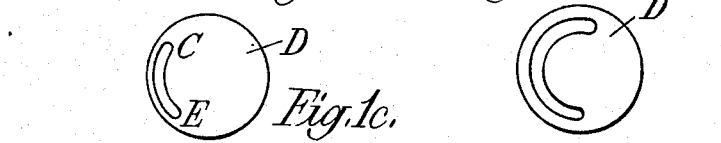
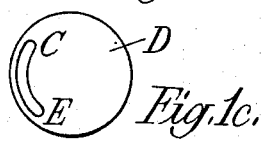
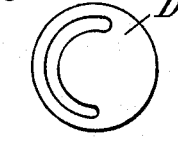
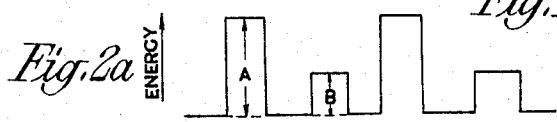
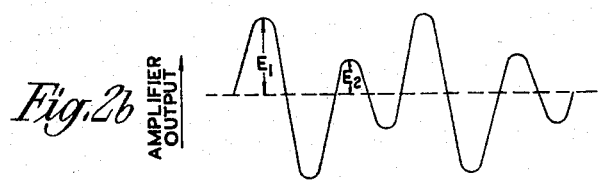
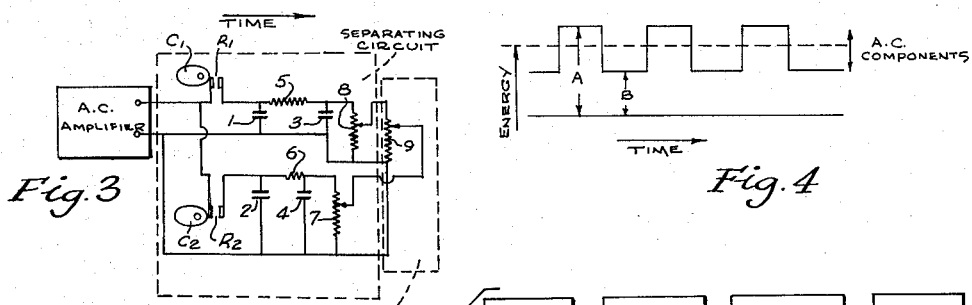
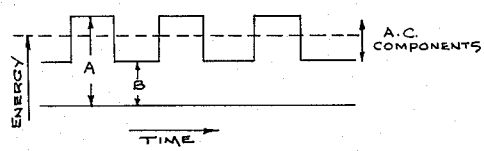
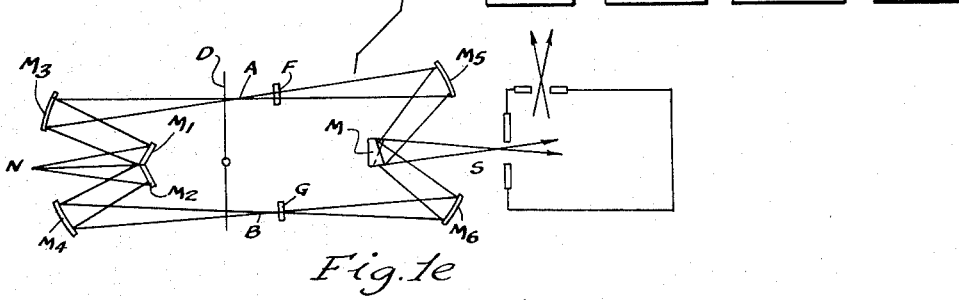

United States Patent Office 2,955,508
Patented Oct. 11, 1960

2,955,508

DOUBLE BEAM SPECTROMETERS

Albert E. Martin, Newcastle-upon-Tyne, England, assignor to C. A. Parsons & Company Limited, Newcastle-upon-Tyne, England Filed Apr. 4, 1956, Ser. No. 576,108

Claims priority, application Great Britain Apr. 18, 1955

1 Claim. (Cl. 88—14)

This invention relates to double beam spectrometers, that is to say, those in which radiation from a suitable source such as a Nernst filament, is switched a number of times a second alternately by way of two beam paths (one including a sample and the other comparison means) before entering the slit of a monochromator in which the radiation is dispersed so as to form a spectrum a given portion of which is selected and passed through an exit slit from the monochromator to fall upon a detecting device which measures the intensity of the radiation passing through the slit.

In U.S. Backhouse Patent No. 2,604,810, issued July 29, 1952, for Improvements in Double Beam Optical System Applicable to Spectrometers and Other Instruments we describe the use of reciprocating mirrors arranged at a fixed angle to one another for switching each beam alternately on to the slit of the monochromator and the purpose of this invention is to achieve the same object without the need for reciprocating mirrors.

According to the present invention, we provide a double beam spectrometer comprising a source of radiation, means for directing radiation along two separate paths, means for holding a sample substance to be tested in one path and comparison means in the other path, means for directing radiation from each beam path alternately into a monochromator for isolating given wavelengths of radiation, detecting means receiving radiations emanating from said monochromator and producing an electrical signal which is proportional to the energy content of said radiations and recording means adapted to receive the signal from said detecting means and recording the transmittance of the sample, in which spectrometer the means for directing radiations from each beam path alternately comprise a plurality of stationary interleaving mirrors forming reflecting surfaces in two planes at an angle to one another and an apertured rotary shutter device arranged to control both paths of radiation whereby the mirrors receive radiation from each path alternately, the radiation from one path falling on the mirrors set in one plane and the radiations from the other path falling on the mirrors set in the other plane.

The invention also consists in a double beam spectrometer substantially as described herein with reference to the accompanying drawings.

The invention will be described further with reference to the accompanying drawings, of which:

Figure 1a is a diagrammatic representation of a spectrometer, omitting the detector, A.C. amplifier, separating circuit, and recorder.

Figure 1b is a perspective view of a stack of interleaved mirrors,

Figure 1c is a view of a shutter disc,

Figure 1d is a view of an alternative shutter disc,

Figure 1e is a view similar to Figure 1a but showing the radiation-responsive measuring means, Figure 2a is a graph showing the detector output with the shutter of Figure 1c, Figure 2b is a corresponding graph for the amplifier output, Figure 3 is a circuit diagram for the separating circuit and recorder, and Figure 4 is a graph showing the detector output with the shutter of Figure 1d.

In carrying the invention into effect in one form illustrated in Figure 1 of the accompanying diagrammatic drawings, a source of radiation N is provided, radiations from which are intercepted by two plane mirrors $M_1$, $M_2$, the reflected radiations from these mirrors striking concave mirrors $M_3$, $M_4$, respectively, whence they are reflected on to two further concave mirrors $M_5$, $M_6$, respectively.

The radiations reflected by the latter mirrors strike the reflecting surfaces of a stack of mirrors M, Figure 1b, consisting of mirrors preferably plane, but not necessarily so, cemented together and alternately staggered so that one set $Ma$ lie on one plane while the other $Mb$ lie on a second plane making a small angle with the first.

These mirrors are mounted so that half of the radiation in one beam is directed by one set of mirrors on to the monochromator slit S, while half of the radiation in the other beam is directed by the other set of mirrors on to the monochromator slit.

D is a circular disc, shown separately at 1c which is driven at a suitable speed by means of a synchronous motor. By suitable speed is meant one at which the detector can respond to the fluctuating radiation falling on it.

The supply for the synchronous motor can be taken from the A.C. mains, or from a local oscillator if greater frequency stability is required.

The rotating disc is preferably mounted near the focal points A, B, so that each radiation beam is as compact as possible at the point of chopping.

The aperture CE occupies approximately one quarter of the circumference of the disc and is wide enough to allow the beams to pass freely. Since radiation in each beam is allowed to pass by the rotating disc for about one quarter of the time taken for one complete revolution, the energy passing through the monochromator slit and ultimately falling on the radiation detector, when displayed as a function of time, has the form shown in Figure 2a. A represents the energy of a particular wavelength of radiation traversing the comparison cell F, while B represents the radiation at the same wavelength traversing the sample in cell G. The information required is the transmittance of the sample relative to the comparison substance, B/A.

After the wave-form of Figure 2a has been amplified an output signal somewhat as shown in Figure 2b will be obtained. The exact shape of the output wave-form will depend on the amplifier characteristics, but in general alternate waves will have different amplitudes $E_1$ and $E_2$ proportional to A and B, respectively.

If as in Figure 3 two pairs of rectifying contacts $R_1$, $R_2$, are employed which are opened and closed by cams $C_1$, $C_2$, driven in synchronism with the rotating shutter, it can be arranged by correct phasing that the first pair close part or whole of the half-wave of amplitude $E_1$, while the second pair close during part or whole of the half-wave of amplitude $E_2$. Currents can thus be obtained proportional to A and B as indicated in Figure 3, after smoothing in the usual manner with capacitors 1, 3; 2, 7 and resistors 5, 8; 6, 7.

By adapting any self-balancing potentiometer recorder so that a voltage proportional to A is fed to the slide wire 9 and a voltage proportional to B applied to the input terminals of the instrument, the position of the pointer will give the ratio B/A which is the transmittance of the sample relative to the comparison substance.

The adjustment of the system in practice is not difficult since when both beams are free from absorbing material, the potentiometer recorder must indicate exactly full scale, and when the sample beam is blanked off the recorder must indicate zero.

In another form of the invention, the chopping disc is modified so that the single aperture of Figure 1c occupies approximately half of the circumference (Figure 1d). The output from the detector now takes approximately the form shown in Figure 4, provided the detector has a sufficiently rapid response. The A.C. component of this output is now amplified and fed to a servo-motor which controls the position of an attenuating diaphragm moving in or out of the comparison beam until the energy is the same in the two beams. The A.C. component of the detector output now drops to zero and the servo-motor comes to rest. The position of the attenuating diaphragm gives a direct measure of the transmittance of the sample and is continuously recorded as the spectrum is scanned.

Whilst two methods of handling the electrical signal obtained from the detector are given above by way of examples, other known methods can be used, but in any case the signal from the detector must take either the form shown in Figure 2a or that shown in Figure 4, according to whether the aperture in the rotating shutter occupies approximately one quarter or one half of the circumference.

What is claimed is:

A double beam spectrometer comprising a radiation source, a monochromator receiving radiation through an entrance slit, alternative optical paths for radiation between said source and monochromator, said paths being accessible for the introduction of a test substance in one path and comparison means in the other, means receiving radiation from each path and focusing it on the entrance slit of the monochromator, said means consisting of a number of stationary interleaved reflecting members each member having a reflecting surface which lies in one of two different planes which are at an angle to one another, reflecting surfaces of alternate members lying in the same plane and reflecting surfaces of adjacent members lying in different planes such that radiation from a given path is focused in a series of separated bands over the full extent in the lengthwise direction of the entrance slit, means for chopping the radiation in each path alternately so that the aforesaid means focusing radiation on the entrance slit and hence the entrance slit receives radiation from each path alternately and means responsive to radiation from the monochromator for measuring the transmittance of the test substance relative to that of the comparison means.

References Cited in the file of this patent
UNITED STATES PATENTS

| | | |
|---|---|---|
| 1,966,354 | Noxon | July 10, 1934 |
| 2,503,165 | Meyer | Apr. 4, 1950 |
| 2,583,143 | Glick | Jan. 22, 1952 |
| 2,680,989 | Savitzky et al. | June 15, 1954 |